United States Patent
Borran et al.

(10) Patent No.: US 9,635,558 B2
(45) Date of Patent: Apr. 25, 2017

(54) ASSOCIATION AND RESOURCE PARTITIONING IN A WIRELESS NETWORK WITH RELAYS

(71) Applicant: QUALCOMM Incorporated, San Diego, CA (US)

(72) Inventors: Jaber Mohammad Borran, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 14/047,788

(22) Filed: Oct. 7, 2013

(65) Prior Publication Data

US 2014/0036763 A1 Feb. 6, 2014

Related U.S. Application Data

(62) Division of application No. 12/725,146, filed on Mar. 16, 2010, now Pat. No. 8,553,711.

(Continued)

(51) Int. Cl.
*H04W 16/02* (2009.01)
*H04B 7/15* (2006.01)
(Continued)

(52) U.S. Cl.
CPC .............. *H04W 16/02* (2013.01); *H04B 7/15* (2013.01); *H04B 7/2606* (2013.01); *H04W 16/26* (2013.01); *H04W 84/047* (2013.01)

(58) Field of Classification Search
CPC ... H04W 16/02; H04W 16/26; H04W 84/047; H04B 7/15; H04B 7/2606
See application file for complete search history.

(56) References Cited

U.S. PATENT DOCUMENTS 7,310,526 B2 * 12/2007 Sang ..................... H04W 36/22
455/436
8,553,711 B2   10/2013 Borran et al.
(Continued)

FOREIGN PATENT DOCUMENTS

CN    101335971 A    12/2008
JP    2010502073 A    1/2010
(Continued)

OTHER PUBLICATIONS

International Search Report and Written Opinion—PCT/US2010/028036, International Search Authority—European Patent Office—Nov. 19, 2010.

(Continued)

*Primary Examiner* — Chi H Pham
*Assistant Examiner* — Weibin Huang
(74) *Attorney, Agent, or Firm* — Nerrie M. Zohn

(57) ABSTRACT

Techniques for performing association and resource partitioning in a wireless network with relays are described. In an aspect, resource partitioning may be performed to allocate available resources to nodes and access/backhaul links of relays. In one design, a node computes local metrics for a plurality of possible actions related to resource partitioning. The node receives local metrics for the possible actions from at least one neighbor node and determines overall metrics for the possible actions based on the computed and received local metrics. The node determines resources allocated to a set of nodes and resources allocated to the access and backhaul links of at least one relay based on the overall metrics for the possible actions. In another aspect, association involving relays may be performed by taking into account the performance of the relays. In yet another aspect, association and resource partitioning may be performed jointly.

10 Claims, 8 Drawing Sheets

Related U.S. Application Data

(60) Provisional application No. 61/161,653, filed on Mar. 19, 2009.

(51) Int. Cl.
 *H04B 7/26* (2006.01)
 *H04W 84/04* (2009.01)
 *H04W 16/26* (2009.01)

(56) References Cited

U.S. PATENT DOCUMENTS

| | | | |
|---|---|---|---|
| 2006/0109829 A1 | 5/2006 | O'Neill | |
| 2007/0086387 A1* | 4/2007 | Kang et al. | 370/331 |
| 2007/0104127 A1* | 5/2007 | Suh | H04W 28/06 |
| | | | 370/328 |
| 2007/0104148 A1* | 5/2007 | Kang | H04W 4/08 |
| | | | 370/331 |
| 2008/0080436 A1 | 4/2008 | Sandhu et al. | |
| 2008/0107075 A1 | 5/2008 | Ramachandran et al. | |
| 2008/0232296 A1* | 9/2008 | Shin | H04B 7/2606 |
| | | | 370/315 |
| 2008/0260000 A1 | 10/2008 | Periyalwar et al. | |
| 2009/0003260 A1* | 1/2009 | Guo et al. | 370/315 |
| 2009/0034447 A1* | 2/2009 | Yu | H04B 7/15542 |
| | | | 370/315 |
| 2009/0163218 A1 | 6/2009 | Liu et al. | |
| 2009/0303918 A1* | 12/2009 | Ma | H04B 7/2606 |
| | | | 370/315 |
| 2011/0134828 A1* | 6/2011 | Osseiran | H04B 7/15521 |
| | | | 370/315 |

FOREIGN PATENT DOCUMENTS

| | | |
|---|---|---|
| JP | 2010521109 A | 6/2010 |
| JP | 2010532973 A | 10/2010 |
| WO | WO-2008020163 A1 | 2/2008 |
| WO | WO-2008127814 A1 | 10/2008 |
| WO | 2009009511 A2 | 1/2009 |

OTHER PUBLICATIONS

Taiwan Search Report—TW099108243—TIPO—Feb. 25, 2013.

* cited by examiner

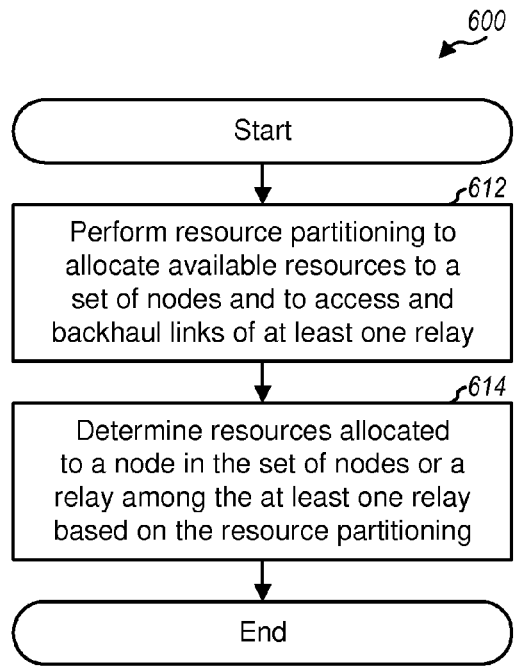
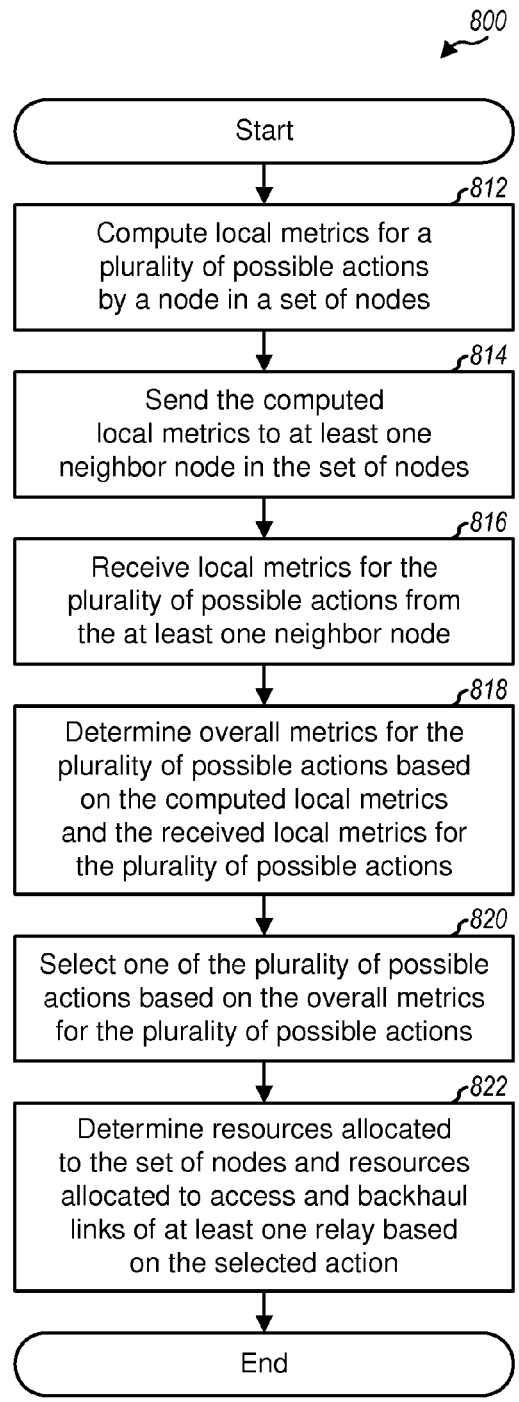
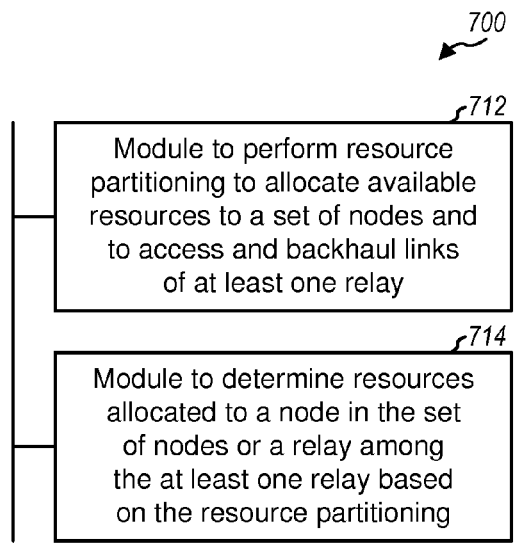

ASSOCIATION AND RESOURCE PARTITIONING IN A WIRELESS NETWORK WITH RELAYS

The present application is a divisional application of U.S. application Ser. No. 12/725,146, entitled "ASSOCIATION AND RESOURCE PARTITIONING IN HETEROGENEOUS NETWORKS WITH RELAYS," filed Mar. 16, 2010 and now patent U.S. Pat. No. 8,553,711, issued Oct. 8, 2013, which claims priority to Provisional U.S. Application Ser. No. 61/161,653, entitled "ASSOCIATION AND RESOURCE PARTITIONING IN HETEROGENEOUS NETWORKS WITH RELAYS," filed Mar. 19, 2009, all assigned to the assignee hereof and incorporated herein by reference.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The wireless network may also include relays to improve coverage and capacity of the wireless network. A relay may communicate with a base station on a backhaul link and may appear as a UE to the base station. The relay may also communicate with one or more UEs on an access link and may appear as a base station to the UE(s). The relay utilizes resources in order to communicate with the base station and the UE(s). It may be desirable to support efficient operation of the relay.

SUMMARY

Techniques for performing association and resource partitioning in a wireless network with relays are described herein. Association refers to a process to determine a serving node for a station. A node may be a base station or a relay, and a station may be a UE or a relay. Resource partitioning refers to a process to allocate available resources to nodes. Resource partitioning may also be used to allocate resources between the access link and backhaul link of relays. Association may also be referred to as server selection. Resource partitioning may also be referred to as resource allocation, resource coordination, etc.

In an aspect, resource partitioning may be performed to allocate available resources to a set of nodes and to the access and backhaul links of at least one relay. In one design, a node in the set of nodes may compute local metrics for a plurality of possible actions related to resource partitioning. The node may receive local metrics for the plurality of possible actions from at least one neighbor node and may determine overall metrics for the possible actions based on the computed local metrics and the received local metrics. The node may determine resources allocated to the set of nodes and resources allocated to the access and backhaul links of the at least one relay based on the overall metrics for the possible actions.

In another aspect, association may be performed by taking into account the performance of relays. In one design, metrics for a plurality of possible actions related to association involving at least one relay may be obtained. The plurality of possible actions may include (i) possible actions for handing out one or more stations from a node to neighbor nodes and/or (ii) possible actions for handing in one or more stations from the neighbor nodes to the node. At least one serving node for at least one station may be determined based on the metrics for the plurality of possible actions. The at least one serving node and the at least one station may comprise the at least one relay. In one design, metrics (e.g., rates) for a relay may be computed based on resources allocated to the access and backhaul links of the relay and/or based on an access capacity and a backhaul capacity of the relay. The metrics may be used to select the at least one serving node for the at least one station.

In yet another aspect, association and resource partitioning may be performed jointly, e.g., by computing metrics for a plurality of possible actions related to association and resource partitioning. In one design, serving nodes be selected for stations and available resources may be allocated to nodes and to access and backhaul links by evaluating different possible associations between stations and nodes, different possible allocations of resources to nodes, and different possible allocations of resources to the access and backhaul links.

Various aspects and features of the disclosure are described in further detail below.

BRIEF DESCRIPTION OF THE DRAWINGS

FIGS. 6 and 7 show a process and an apparatus, respectively, for supporting communication with unified resource partitioning for nodes and access/backhaul links.

FIG. 8 shows a process for performing unified resource partitioning,

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
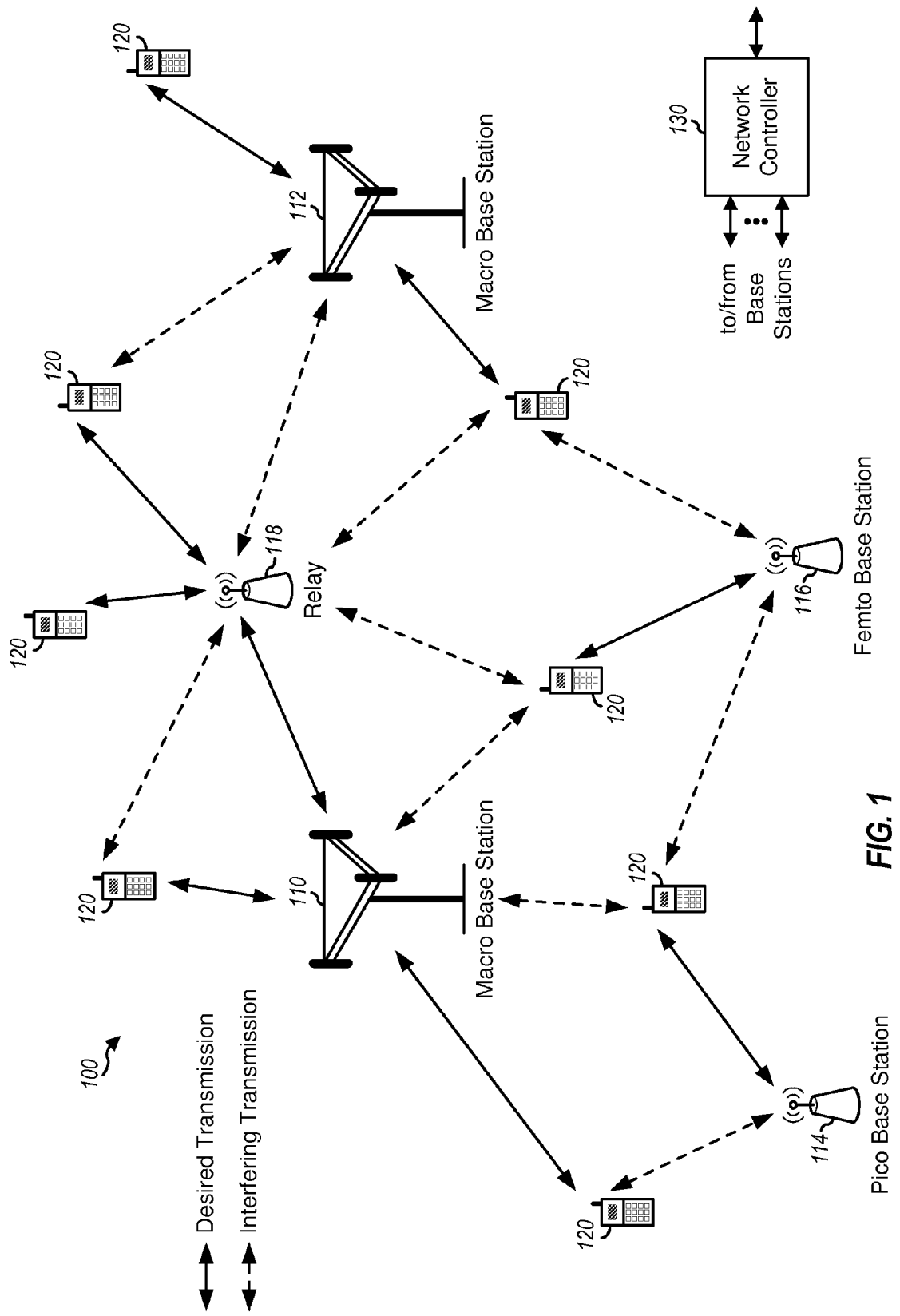
FIG. 1 shows a wireless communication network.

FIG. 1 shows a wireless communication network 100, which may include a number of base stations and other network entities. A base station may be an entity that communicates with UEs and relays and may also be referred to as a node, a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110 and 112 for macro cells, a pico base station 114 for a pico cell, and a femto/home base station 116 for a femto cell.

Wireless network 100 may also include relays, e.g., a relay 118. A relay may be an entity that receives a transmission of data from an upstream entity (e.g., a base station or a UE) and sends a transmission of the data to a downstream entity (e.g., a UE or a base station). A relay may also be a UE that relays transmissions for other UEs. A relay may also be referred to as a node, a station, a relay station, a relay base station, a relay node, etc.

Wireless network 100 may be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts or 43 dBm), pico base stations and relays may have a lower transmit power level (e.g., 2 Watts or 33 dBm), and femto base stations may have a low transmit power level (e.g., 0.2 Watts or 23 dBm). Different types of base stations may belong in different power classes having different maximum transmit power levels.

A network controller 130 may couple to a set of base stations and may provide coordination and control for these base stations. Network controller 130 may communicate with base stations via a backhaul. The base stations may also communicate with one another via the backhaul.

UEs 120 may be dispersed throughout wireless network 100, and each UE may be stationary or mobile. A UE may also be referred to as a station, a terminal, a mobile station, a subscriber unit, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with base stations, relays, other UEs, etc.

Figure 2:
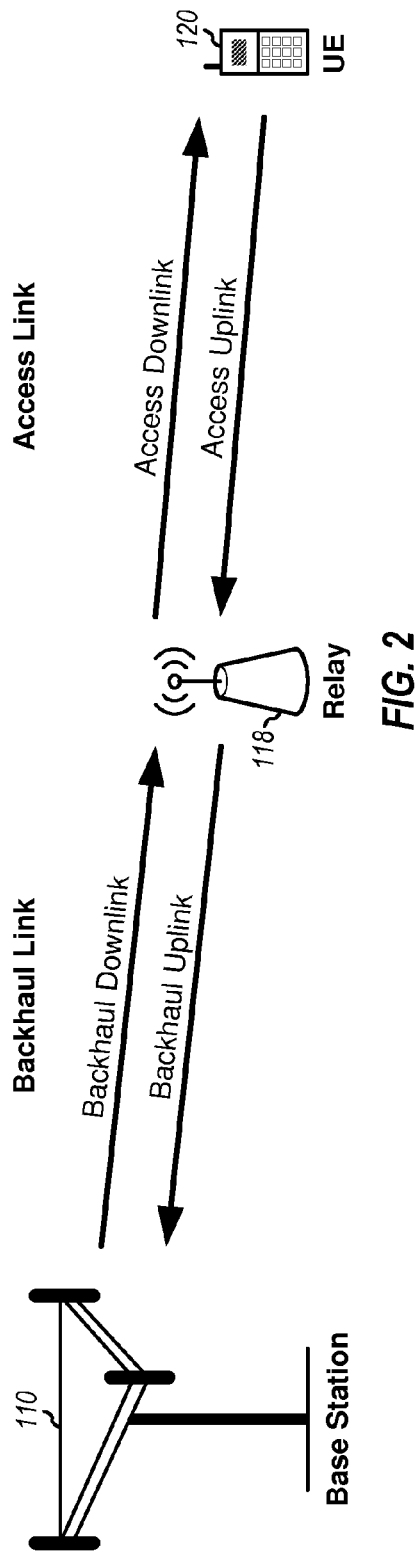
FIG. 2 shows communication between a base station and a UE via a relay.

FIG. 2 shows communication between base station 110 and UE 120 via relay 118. Relay 118 may communicate with base station 110 via a backhaul link and may communicate with UE 120 via an access link. On the backhaul link, relay 118 may receive downlink transmissions from base station 110 via a backhaul downlink and may send uplink transmission to base station 110 via a backhaul uplink. On the access link, relay 118 may send downlink transmissions to UE 120 via an access downlink and may receive uplink transmission from UE 120 via an access uplink.

The wireless network may support a set of resources for each of the downlink and uplink. The available resources may be defined based on time, or frequency, or both time and frequency, or some other criteria. For example, the available resources may correspond to different frequency subbands, or different time interlaces, or different time-frequency blocks, etc. A time interlace may include evenly spaced time slots, e.g., every S-th time slot, where S may be any integer value. The available resources may be defined for the entire wireless network.

Relay 118 typically cannot transmit and receive on the same frequency channel at the same time. Hence, some of the available resources for the downlink may be allocated for the access link and may be referred to as downlink access resources. Relay 118 may send downlink transmissions to UE 120 on the downlink access resources and may receive downlink transmissions from base station 110 on the remaining downlink resources. Similarly, some of the available resources for the uplink may be allocated for the access link and may be referred to as uplink access resources. Relay 118 may receive uplink transmissions from UE 120 on the uplink access resources and may send uplink transmissions to base station 110 on the remaining uplink resources. For clarity, much of the description below is for transmission on the downlink.

Figure 3:
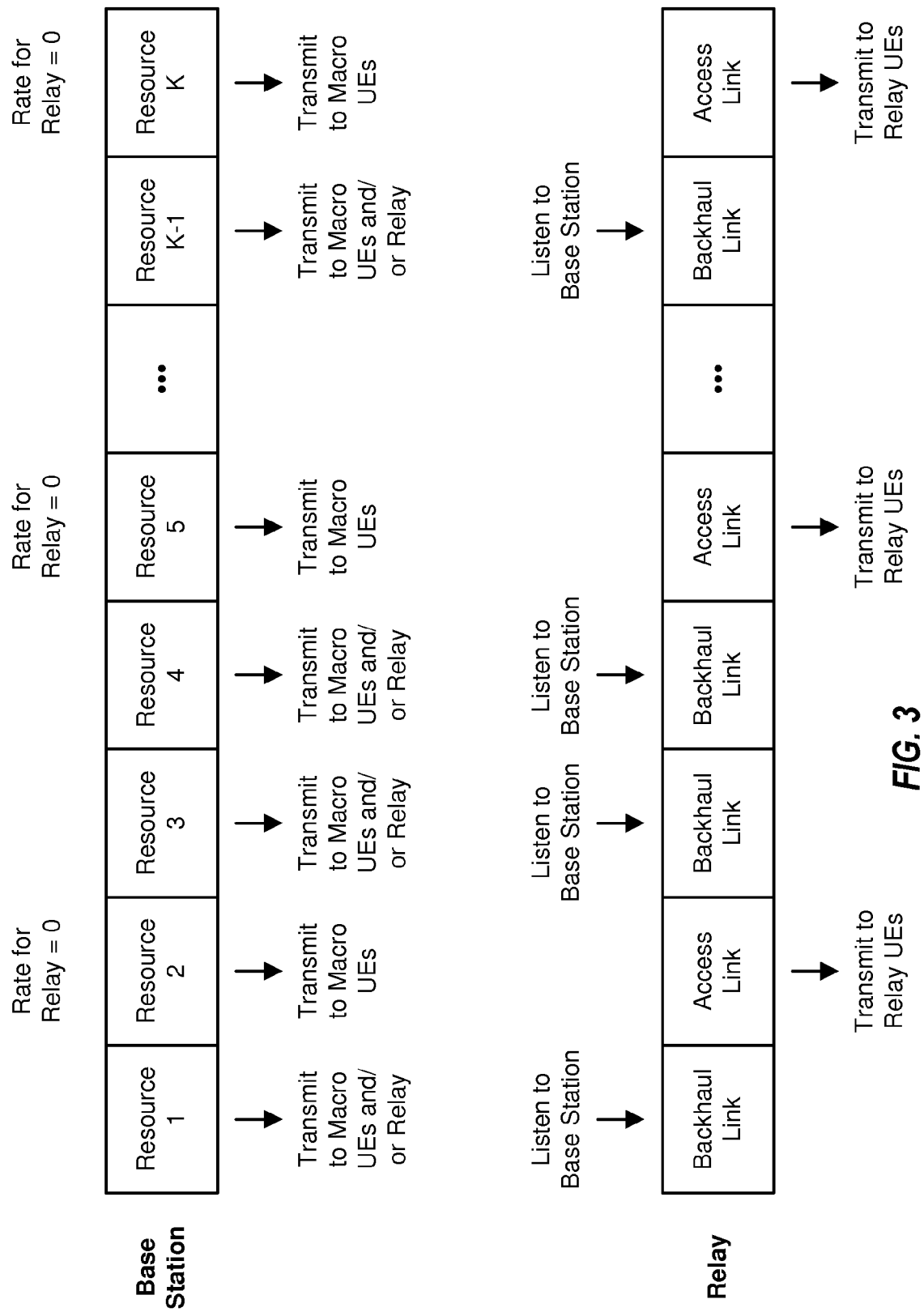
FIG. 3 shows partitioning of resources between the access and backhaul links.

FIG. 3 shows exemplary partitioning of the available resources for the downlink between the backhaul link and the access link of relay 118. K resources with indices of 1 through K may be available for the downlink, where K may be any integer value. In the example shown in FIG. 3, resources 2, 5, . . . , K are allocated for the access downlink. Relay 118 may transmit to its UEs (or relay UEs) on resources 2, 5, . . . , K and may listen for transmissions from serving base station 110 on the remaining downlink resources. Base station 110 may transmit to its UEs (or macro UEs) on resources 2, 5, . . . , K and may transmit to its UEs and/or relay 118 on the remaining resources.

In the description herein, a node may be a base station or a relay. A base station may be a macro base station, a pico base station, a femto base station, etc. A node serving a relay is referred to as a serving node of the relay. A node serving a UE is referred to as a serving node of the UE. A station is an entity that communicates with a node. A station may be a UE or a relay. In one scenario, a station may be a UE, and a node may be a base station or a relay. In another scenario, a station may be a relay, and a node may be a base station.

In an aspect, unified resource partitioning may be performed to allocate the available resources for a given link (e.g., the downlink or uplink) to a set of nodes and to the access and backhaul links of one or more relays. Unified resource partitioning may thus cover both (i) resource partitioning to allocate the available resources to the set of nodes, e.g., to mitigate interference, and (ii) resource partitioning to allocate resources between the access and backhaul links of the relay(s). Unified resource partitioning for nodes and access/backhaul links may improve performance due to inter-dependency between relays and their serving nodes. In particular, scheduling decisions of a relay may affect the performance of its serving node and possibly other nodes. Similarly, scheduling decisions of a serving node may affect the performance of its relay(s) and other nodes. Improved performance may be achieved by concurrently performing (i) resource partitioning to allocate the available resources to the set of nodes and (ii) resource partitioning between the access and backhaul links of relay(s). Unified resource partitioning for nodes and access/backhaul links may be performed as described below.

A station (e.g., a UE or a relay) may be located within the coverage of one or more nodes. In one design, a single node may be selected to serve the station on both the downlink and uplink. In another design, one node may be selected to serve the station on each of the downlink and uplink. For both designs, a serving node may be selected for the station based on a metric such as maximum geometry/signal strength, minimum pathloss, maximum energy/interference efficiency, maximum user throughput, etc. Geometry relates to received signal quality, which may be quantified by a carrier-over-thermal (CoT), a signal-to-noise ratio (SNR), a signal-to-noise-and-interference ratio (SINR), a carrier-to-interference ratio (C/I), etc. Maximizing energy/interference efficiency may entail (i) minimizing a required transmit energy per bit or (ii) minimizing a received interference energy per unit of received useful signal energy. Part (ii) may correspond to maximizing the ratio of channel gain for an intended node to a sum of channel gains for all interfered nodes. Maximizing user throughput may take into account various factors such as the loading of a node (e.g., the number of stations currently served by the node), the amount of resources allocated to the node, the available backhaul capacity of the node, etc.

Association may be performed for a station when it is first powered on and may be referred to as initial association. Association may also be performed to select a new serving node for handover of the station.

In another aspect, association involving one or more relays may be performed by taking into account the performance of the relay(s). Association involving a relay may cover (i) selecting a serving node for the relay or (ii) determining whether to select the relay as a serving node for a UE. In either case, the performance of the relay may be determined based on characteristics of the relay (e.g., the resources allocated to the access and backhaul links of the relay) and may be used for server selection.

Resource partitioning and association may be related, and one may affect the other. For example, a new association between a station and a node may shift loading from one node to another node and may trigger/require resource partitioning, e.g., to address high interference due to link imbalance or restricted association. Conversely, resource partitioning may affect signal and interference conditions on different resources, which may affect metrics used for determining association. For example, metrics such as downlink geometry may no longer be indicative of signal quality on all resources due to changes in signal and interference conditions resulting from resource partitioning. Furthermore, resource partitioning may affect the amount of available resources for nodes and may be affected by cell loading.

In yet another aspect, association and resource partitioning may be performed jointly. For joint association and resource partitioning, serving nodes may be selected for stations and available resources may be allocated to nodes and to access and backhaul links by considering different possible associations between stations and nodes, different possible allocations of resources to nodes, and different possible allocations of resources to the access and backhaul links. This may allow association to take into account current resource partitioning and loading, allow resource partitioning to be updated based on association updates, and allow association to be updated based on changes in resource partitioning and/or other association updates.

In one design, association and/or resource partitioning may be performed in a centralized manner. In this design, a designated entity may receive pertinent information for stations and nodes, compute metrics for association and/or resource partitioning, and select the best association and/or resource partitioning based on the computed metrics. In another design, association and/or resource partitioning may be performed in a distributed manner by a set of nodes. In this design, each node may compute certain metrics and may exchange metrics with neighbor nodes. Each node may then determine and select the association and/or resource partitioning that can provide the best performance.

Association and/or resource partitioning may be performed for only the downlink, or only the uplink, or both the downlink and uplink. Resource partitioning may be performed in different manners for the downlink and uplink. For clarity, joint association and resource partitioning for the downlink is described in detail below.

Table 1 lists a set of components that may be used for joint association and resource partitioning for the downlink.

TABLE 1

| Component | Description |
|---|---|
| Active Set | A set of nodes maintained for a given station t and denoted as AS(t). |
| Neighbor Set | A set of nodes maintained for a given node p and denoted as NS(p). |
| Resources | Time and/or frequency resources that may be allocated to nodes. |
| Transmit PSD | A set of transmit power spectral density (PSD) levels |

TABLE 1-continued

| Component | Description |
| --- | --- |
| Levels | that may be used for any given resource by a node. |
| Utility Function | A function used to quantify the performance of different possible association and resource partitioning. |

In one design, an active set may be maintained for each station and may be determined based on pilot measurements made by the station and/or pilot measurements made by nodes. An active set for a given station t may include nodes that (i) have non-negligible contribution to signal or interference observed by station t on the downlink and/or (ii) receive non-negligible signal or interference from station t on the uplink. In one design, a node may be included in the active set of station t if the CoT of this node is greater than a threshold of $CoT_{min}$. A node may also be included in the active set based on received signal strength and/or other criteria. The active set may be limited (e.g., to N strongest nodes, where N may be any suitable value) in order to reduce computation complexity for association and/or resource partitioning.

In one design, a neighbor set may be maintained for each node and may include nodes that participate in association and/or resource partitioning. The neighbor set for each node may be determined based on active sets of stations. In one design, a neighbor set for a given node p may include (i) nodes that are in the active sets of stations served by node p and (ii) nodes serving stations that have node p in their active sets. The neighbor set may thus include node p and its neighbor nodes. The neighbor set may be limited in order to reduce computation complexity for association and/or resource partitioning.

A neighbor set may be formed in various manners when relays are present. In a first neighbor set design, a neighbor set may include nodes corresponding to base stations as well as relays. In this design, metrics may be computed for each node (including each relay) in the neighbor set and used for association and/or resource partitioning. In a second neighbor set design, a neighbor set may include nodes corresponding to base stations but not relays. In this design, metrics may be computed for serving nodes of relays and may account for the effects of the relays. For both designs, a neighbor set may include nodes that are neighbors of a relay even though these nodes may not be neighbors of one another. For example, a given relay z may be served by a serving node s and may be within range of another node q, with nodes s and q not being within range of one another. A neighbor set for node s may include node q due to potential effects from relay z. Similarly, a neighbor set for node q may include node s due to potential effects from relay z. For the first neighbor set design, if serving node s is included in a neighbor set of another node, then relay z may also be included in the neighbor set. A neighbor set may also be defined in other manners.

In one design, a set of transmit PSD levels may be defined for each node and may include all transmit PSD levels that can be used by the node for each resource on the downlink. A node may use one of the transmit PSD levels for each resource. In one design, the set of transmit PSD levels may include a nominal PSD level, a low PSD level, a zero PSD level, etc. The nominal PSD level on all available resources may correspond to the maximum transmit power of the node. The set of transmit PSD levels for the node may be dependent on the power class of the node. In one design, the set of transmit PSD levels for a given power class may be the union of the nominal PSD levels of all power classes lower than or equal to this power class, plus zero PSD level. For example, a macro base station/node may include a nominal PSD level of 43 dBm (for the macro power class), a low PSD level of 33 dBm (corresponding to the nominal PSD level for the pico power class), and a zero PSD level. The set of transmit PSD levels for each power class may also be defined in other manners.

A utility function may be used to compute local metrics and overall metrics for association and/or resource partitioning. A local metric for a given node p may be denoted as U(p) and may be indicative of the performance of the node for a given association and/or resource partitioning. An overall metric for a set of nodes, NS, may be denoted as V(NS) and may be indicative of the overall performance of the set of nodes for a given association and/or resource partitioning.

In one design, the utility function may be defined based on a sum of user rates, as follows:

$$U(p) = \sum_{S(t)=p} R(t) \qquad \text{Eq (1)}$$

and $$V(NS) = \sum_{p \in NS} U(p),$$

where S(t) is a serving node for station t, and
R(t) is a rate achieved by station t for node p.

In other designs, the utility function may be equal to the minimum of user rates, or the sum of log of user rates, or the sum of log of log of user rates, or the sum of $-1/(\text{user rate})^3$, or some other function of rate, latency, queue size, etc.

Local metrics for each node may be computed based on the rates of stations served by that node, e.g., as shown in equation (1). In one design, the rate of each station may be estimated by assuming that the station is assigned a fraction of each available resource. This fraction may be denoted as $\alpha(t,r)$ and may be viewed as the fraction of time during which resource r is assigned to station t. The rate for station t may then be computed as follows:

$$R(t) = \sum_{r} \alpha(t, r) \cdot SE(t, r) \cdot W(r), \qquad \text{Eq (2)}$$

where SE(t,r) is the spectral efficiency of station t on resource r, and
W(r) is the bandwidth of resource r.

The spectral efficiency of station t on resource r may be determined as follows:

$$SE(t, r) = C\left(\frac{PSD(p, r) \cdot G(p, t)}{N_0 + \sum_{q \neq p} PSD(q, r) \cdot G(q, t)}\right), \qquad \text{Eq (3)}$$

where PSD(p,r) is the transmit PSD of serving node p on resource r,
PSD(q,r) is the transmit PSD of neighbor node q on resource r,
G(p,t) is the channel gain between serving node p and station t, G(q,t) is the channel gain between neighbor node q and station t, $N_0$ is ambient interference and thermal noise observed by station t, and C( ) denotes a capacity function.

In equation (3), the numerator within the parenthesis denotes the desired received power from serving node p at station t. The denominator denotes the total interference from all neighbor nodes as well as $N_0$ at station t. The transmit PSD used by nodes p and q on resource r may be known from the current resource partitioning. The channel gains for nodes p and q may be obtained based on pilot measurements from station t. $N_0$ may be measured/estimated by UE t and included in the computation, or may be reported by UE t to the wireless network (e.g., to serving node p), or may be ignored (e.g., when the computation is done by node p). The capacity function may be a constrained capacity function, an unconstrained capacity function, etc.

A pre-scheduler for each node may perform scheduling forecast and may maximize the utility function over the space of the $\alpha(t,r)$ parameter, as follows:

$$\text{maximize } U(p), \text{ for } 0 \leq \alpha(t,r) \leq 1 \text{ and } \sum_{S(t)=p} \alpha(t,r) \leq 1. \quad \text{Eq (4)}$$

Equation (4) shows a convex optimization on the $\alpha(t,r)$ parameter and may be solved numerically.

The rate for station t may be constrained as follows:

$$R(t) \leq R_{max}(t), \quad \text{Eq (5)}$$

where $R_{max}(t)$ is the maximum rate supported by station t.

The overall rate R(p) for node p may also be constrained as follows:

$$R(p) = \sum_{S(t)=p} R(t) \leq R_{BH}(p), \quad \text{Eq (6)}$$

where $R_{BH}(p)$ is a backhaul capacity of node p.

Different types of nodes may have different backhaul capacities. The backhaul capacity of a base station may be a fixed value whereas the backhaul capacity of a relay may be a variable value, which may be dependent on the access/backhaul partitioning for the relay. The backhaul capacity of node p may be sent to neighbor nodes via the backhaul and/or over the air for association decisions.

Figure 4:
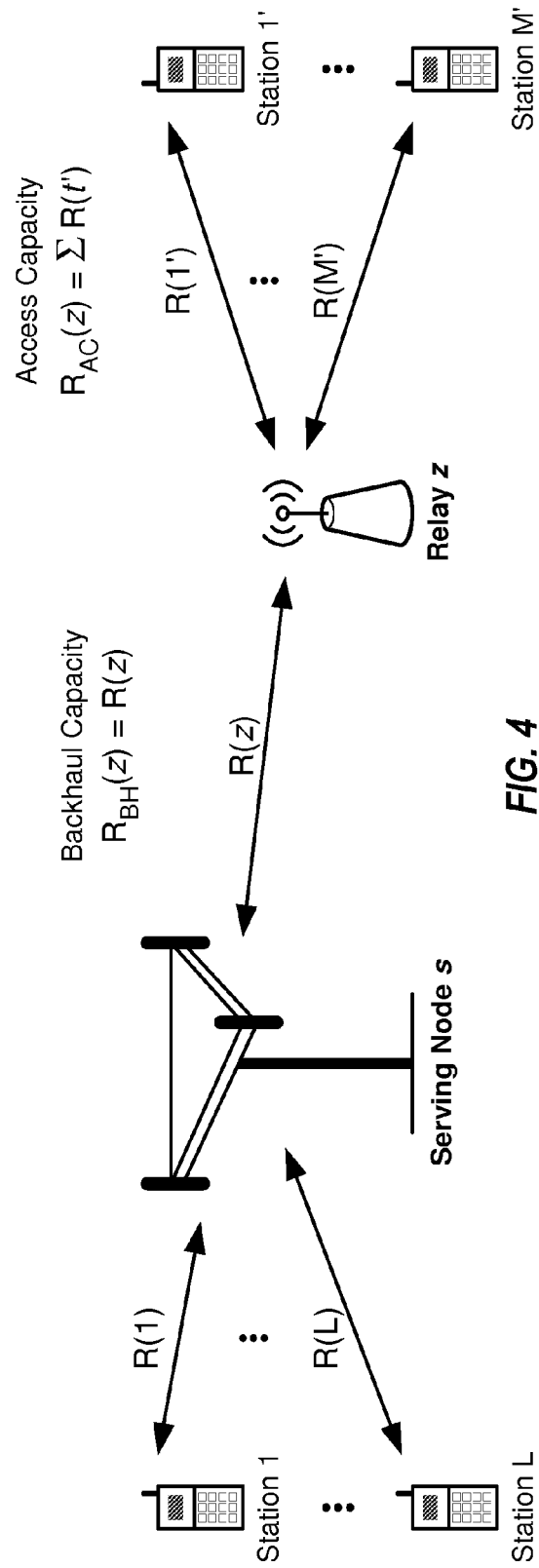
FIG. 4 shows access capacity and backhaul capacity of a relay.

FIG. 4 shows access capacity and backhaul capacity of a given relay z. In the example shown in FIG. 4, relay z serves M stations 1' through M' on resources allocated to the access downlink by the resource partitioning under consideration. Relay z obtains rates of R(1') through R(M') for these M stations. The access capacity of relay z may be computed as follows:

$$R_{AC}(z) = \sum_{S(t')=z} R(t'), \quad \text{Eq (7)}$$

where R(t') is the rate achieved by station t' for relay z, and $R_{AC}(z)$ is the access capacity of relay z.

In the example shown in FIG. 4, serving node s serves L stations 1 through L as well as relay z on resources allocated to node s by the resource partitioning under consideration.

Serving node s obtains rates of R(1) through R(L) for these L stations and a rate of R(z) for relay z. The rate for each station and the rate for relay z may be computed as shown in equations (2) and (3). However, relay z is not scheduled by serving node s on resources allocated to the access downlink, since relay z may transmit to its stations on these resources. Hence, the $\alpha(z,r)$ parameter for relay z may be set to zero for each resource allocated to the access downlink, and the rate R(z,r) for relay z on each such resource will be zero. For the example shown in FIG. 3, relay z is not scheduled by serving node s on resources 2, 5, . . . , K and has a rate of zero for each of these resources.

Serving node s may obtain a rate of R(z) for relay z on all resources. The backhaul capacity of relay z may then be given as follows:

$$R_{BH}(z)=R(z), \quad \text{Eq (8)}$$

where $R_{BH}(z)$ is the backhaul capacity of relay z.

As shown in FIG. 4, the access and backhaul capacities of relay z may be dynamic and dependent on the resource partitioning under consideration. Ideally, the access capacity of relay z should be equal to the backhaul capacity of relay z. If the access capacity is greater than the backhaul capacity, then the total rate achieved by relay z would be limited by the backhaul capacity, and some resources allocated to the access link may be under-utilized. The total rate for all stations served by relay z may be limited by the backhaul capacity, as follows:

$$\sum_{S(t')=z} R(t') \leq R_{BH}(z). \quad \text{Eq (9)}$$

Conversely, if the access capacity is less than the backhaul capacity, then the total rate achieved by relay z would be limited by the access capacity, and some resources allocated to the backhaul downlink may be under-utilized. The rate for relay z may be limited based on the access capacity, as follows:

$$R(z) \leq R_{AC}(z). \quad \text{Eq (10)}$$

The limited rate from equation (10) may be used to compute local metrics for serving node s. Limiting the rate of relay z as shown in equation (10) may result in more accurate local metrics for serving node s.

The backhaul capacity of relay z may be matched to the access capacity of relay z as follows. First, serving node s may perform pre-scheduling by assuming no access limitation at relay z (i.e., infinite access capacity) and may obtain rate R(z) as the backhaul capacity of relay z. Relay z may also perform pre-scheduling by assuming no backhaul limitation (i.e., infinite backhaul capacity) and may sum the rates of all stations served by relay z to obtain the access capacity of relay z. Next, serving node s may send the backhaul capacity to relay z, which may also send the access capacity to serving node s. If the access capacity is less than the backhaul capacity, then serving node s may perform pre-scheduling again with the new access capacity constraint. Conversely, if the backhaul capacity is less than the access capacity, then relay z may perform pre-scheduling again with the new backhaul capacity constraint. Alternatively, the processing described above may be performed iteratively by one node at a time.

The pre-scheduler for each node may perform scheduling forecast and may be different from an actual scheduler, which may maximize a marginal utility in each scheduling interval. In one design, the pre-scheduler for serving node s may treat relay z as one station served by node s. In another design, the pre-scheduler may take into account the number of stations served by relay z for improved fairness. For example, if relay z is serving M stations with a total rate of R(z), then the pre-scheduler may model relay z as M stations each with a rate of R(z)/M. This may result in relay z being allocated more resources if the utility function is based on the log of user rates or some other nonlinear function of user rates.

Station t (e.g., a UE or a relay) may be served by node p and may have its rate taken into account in the computation of local metrics for node p, e.g., as shown in equation (1). For association, station t may be handed over from node p to another node, e.g., in the neighbor set. In one design, a spectral efficiency SE(t,q,r) may be estimated for station t on each resource r for each candidate node q to which station t might be handed over. This spectral efficiency may be estimated as shown in equation (3) based on the current transmit PSD levels and the channel gains of all nodes in the active set of station t on resource r. The rate R(t,q) achieved by station t for candidate node q may then be estimated as:

$$R(t, q) = \frac{\min\left(\sum_r SE(t, q, r) \cdot W(r), R_{BH}(q)\right)}{N(q) + 1}, \quad \text{Eq (11)}$$

where N(q) is the number of stations currently served by candidate node q (excluding station t).

In equation (11), the numerator provides the overall rate achieved by station t on all available resources for candidate node q, which may be a base station or a relay. Equation (11) is different from equation (3), which assumes that station t is assigned each resource for a fraction of the time. The overall rate achieved by station t on all available resources may be limited by the backhaul capacity of node q. The overall rate may be divided by the number of stations currently served by node q plus one to account for station t being handed over to node q. The rate from equation (11) may be an estimated rate with station t being assigned the same fraction of the available resource as other stations currently served by node q.

If candidate node q is not serving any station, then its current transmit PSD on all resources may be zero, and the rate estimate from equation (11) may be zero. This may be addressed in various manners. In one design, candidate node q may compute and advertise the best initial resource $r_B(q)$, which may be determined based on a different utility function, e.g., a utility function with a nominal transmit PSD level being used on resource r. Station t may estimate its rate for candidate node q by assuming that this resource will be assigned to station t after association with node q. This assumption may be used for only candidate nodes not currently serving any stations.

The rate R(t,q) achieved by station t for candidate node q may be used to compute local metrics for node q, which may in turn be used to make decisions on association and resource partitioning. As shown in equation (11), the rate R(t,q) may be affected by (i) other associations, which may affect N(q) for the number of stations served by node q, and (ii) resource partitioning, which may affect the spectral efficiency R(t,q,r) of station t on each resource r.

A given node n (e.g., a base station or a relay) may hand out one or more stations to other nodes and/or may receive (hand in) one or more stations from other nodes. For each station to be handed out, rate R(t,q) may be computed for each candidate node for the station, and the α(t,r) parameter for the station may be set to zero at node n. Local metrics for each candidate node may be computed by taking into account the rate R(t,q) of the station for that candidate node. The resources previously assigned to the station by node n may be re-assigned to other stations served by node n. For each station to be handed in, rate R(t,n) may be computed for the station for node n, and the α(t,r) parameter for the station may be set to zero at the current serving node of the station. Local metrics for node n may be computed by taking into account the rate R(t,n) of the station for node n.

The rate in equation (11) may also be used as a metric for initial association when station t first accesses the wireless network. Station t may compute the estimated rate for each detectable node. Station t may assume an infinite backhaul capacity for each node for which this information is not available. Station t may access the node with the highest estimated rate and may then become part of the scheduling forecast of that node.

In one design, an adaptive algorithm may be used for joint association and resource partitioning. The algorithm is adaptive in that it can take into consideration the current operating scenario, which may be different for different parts of the wireless network and may also change over time. The adaptive algorithm may be performed by each node in a distributed manner and may attempt to maximize the utility function over a set of nodes or possibly across the entire wireless network.

Figure 5:
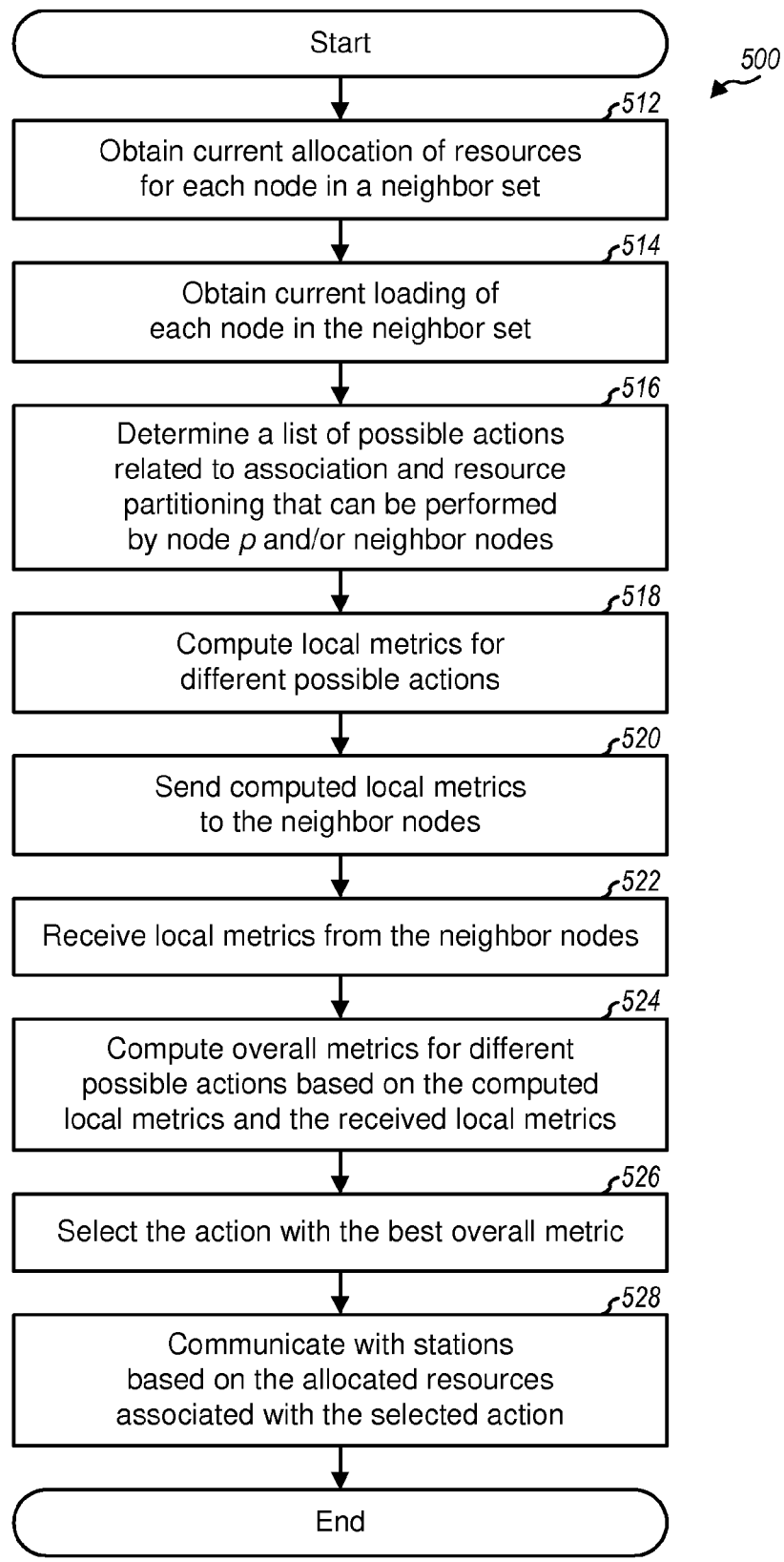
FIG. 5 shows a process for performing association and resource partitioning.

FIG. 5 shows a design of a process 500 for performing joint association and resource partitioning. Process 500 may be performed by each node in a neighbor set for a distributed design. For the first neighbor set design described above, the neighbor set may include nodes corresponding to base stations as well as relays. In this design, each base station and each relay in the neighbor set may perform process 500. For the second neighbor set design described above, the neighbor set may include nodes correspond to base stations but not relays. In this design, each base station in the neighbor set may perform process 500 and may take into account the effects of all relays (if any) served by that base station. For clarity, process 500 is described below for node p, which may be a base station or possibly a relay.

Node p may obtain the current allocation of resources for each node in the neighbor set (step 512). For the downlink, the allocation of resources for a node may be defined by a list of transmit PSD levels for the available resources, one transmit PSD level for each available resource. The transmit PSD level for each resource may indicate an allowed transmit PSD for the node on the resource. Node p may also obtain the current loading of each node in the neighbor set (step 514). The loading of a node may be defined by the number of stations being served by the node, the percentage of resources used by the node, etc. Node p may obtain the current allocated resources and the current loading of the neighbor nodes via the backhaul or through other means. Node p may also advertise its current allocated resources and/or loading via the backhaul to the neighbor nodes and possibly over the air for use by stations for initial access or handover decisions.

Node p may determine a list of possible actions related to association and resource partitioning that can be performed by node p and/or neighbor nodes (step 516). A possible action may cover only association, or only resource partitioning, or both association and resource partitioning. A possible action for resource partitioning may cover a specific allocation of resources for node p as well as a specific allocation of resources for each neighbor node in the neighbor set. For the downlink, a possible action for resource partitioning may entail node p changing its transmit PSD on a particular resource and/or a neighbor node changing its transmit PSD on the resource. A possible action for association and resource partitioning may cover a station being handed over to a neighbor node and a grant of an available resource (e.g., a higher transmit PSD level) to the neighbor node. Some possible actions for association and resource partitioning are described below.

For the first neighbor set design described above, the list of possible actions may include possible actions related to resource partitioning for different nodes as well as possible actions related to resource partitioning between the access and backhaul links of relays. For example, one possible action may cover (i) node p being allocated certain resources and (ii) a first partitioning of the allocated resources between the access and backhaul links of relay z. Another possible action may cover (i) node p being allocated the same resources and (ii) a second partitioning of the allocated resources between the access and backhaul links of relay z.

For the second neighbor set design described above, the list of possible actions may include possible actions related to resource partitioning for different nodes. For a given possible action with node p being allocated certain resources, different possible partitioning of the allocated resources between node p and relay z may be evaluated. The access/backhaul partitioning with the best performance may be used to compute the local metric for node p for the possible action.

The list of possible actions may include (i) standard actions that may be evaluated periodically without any explicit request and/or (ii) on-demand actions that may be evaluated in response to requests from neighbor nodes. The standard actions may involve one resource and either one or two nodes. The on-demand actions may involve handover of stations, allocation for more than one resource (e.g., for handover negotiation), actions involving more than one neighbor node (e.g., for resource partitioning), etc.

Node p may compute local metrics for different possible actions (block 518). For example, a local metric based on the sum rate utility function in equation (1) may indicate an overall rate achieved by node p for a particular action a and may be computed as follows:

$$U(p, a) = \sum_{S(t)=p} R(t, a), \quad \text{Eq (12)}$$

where R(t,a) is the rate achieved by station t for action a, and
U(p,a) is a local metric for node p for action a.

The rate R(t,a) for each station may be computed as shown in equations (2) and (3), where PSD(p,r) and PSD(q,r) may be dependent on the lists of transmit PSD levels for nodes p and q, respectively, associated with possible action a. In general, the local metric for node p for each possible action may be dependent on the utility function.

The local metrics for different possible actions may be used by node p as well as the neighbor nodes to compute overall metrics for different possible actions. Node p may send its computed local metrics U(p,a), for a ∈ A, to the neighbor nodes, where A denotes the list of possible actions (block 520). Node p may also receive local metrics U(q,a), for a ∈ A, from each neighbor node q in the neighbor set (block 522). Node p may compute overall metrics for different possible actions based on its computed local metrics and the received local metrics (block 524). For example, an overall metric based on the sum rate utility function in equation (1) may be computed for each possible action a, as follows:

$$V(a) = U(p, a) + \sum_{q \in NS(p) \setminus \{p\}} U(q, a), \quad \text{Eq (13)}$$

where V(a) is an overall metric for possible action a. The summation in equation (13) is over all neighbor nodes in the neighbor set except for node p.

After completing the metric computation, node p may select the action with the best overall metric (block 526). Each neighbor node may similarly compute overall metrics for different possible actions and may also select the action with the best overall metric. Node p and the neighbor nodes should select the same action if they operate on the same set of local metrics. Each node may then operate based on the selected action, without having to communicate with one another regarding the selected action. However, node p and its neighbor nodes may operate on different local metrics and may obtain different best overall metrics. This may be the case, for example, if node p and its neighbor nodes have different neighbor sets. In this case, node p may negotiate with the neighbor nodes to determine which action to take. This may entail exchanging overall metrics for some promising actions between the nodes and selecting the action that can provide good performance for as many nodes as possible.

Regardless of how the best action is selected, the selected action is associated with a specific allocation of resources for node p and possibly specific association updates for node p. Node p may perform handovers of stations based on the association updates, if any. Node p may communicate with its stations based on the resources allocated to node p by the selected action (block 528). The allocated resources may be defined by a list of transmit PSD levels, one specific transmit PSD level for each available resource. Node p may use the specified transmit PSD level for each available resource.

There may be a large number of possible actions to evaluate for an exhaustive search to find the best action. The number of possible actions to evaluate may be reduced in various manners. In one design, each available resource may be treated independently, and a given action may change the transmit PSD level of only one resource. In another design, the number of nodes that can adjust their transmit PSD levels on a given resource for a given action may be limited. In yet another design, the transmit PSD for a given node on a given resource may be either increased or decreased by one level at a time. The number of possible actions may also be reduced via other simplifications.

In one design, a list of possible actions that may lead to good overall metrics may be evaluated. Possible actions that are unlikely to provide good overall metrics may be skipped in order to reduce computation complexity. For example, having both node p and a neighbor node increase their target transmit PSD levels on the same resource will likely result in extra interference on the resource, which may degrade performance for both nodes. This possible action may thus be skipped. As another example, having node p hand out a station to neighbor node q and also claim a resource from node q will likely result in a lower overall metric. This possible action may also be skipped.

Table 2 lists different types of actions for resource partitioning that may be evaluated, in accordance with one design.

TABLE 2

Action Types for Resource Partitioning

| Action Type | Description |
| --- | --- |
| p-C-r | Node p claims resource r and increases its transmit PSD by one level on resource r. |
| p-B-r | Node p blanks resource r and decreases its transmit PSD by one level on resource r. |
| p-R-r-Q | Node p requests resource r from one or more neighbor nodes in set Q and asks the neighbor node(s) in set Q to decrease their transmit PSD by one level on resource r. |
| p-G-r-Q | Node p grants resource r to one or more neighbor nodes in set Q and tells the neighbor node(s) in set Q to increase their transmit PSD by one level on resource r. |
| p-CR-r-Q | Node p claims and requests resource r from one or more neighbor nodes in set Q and (i) increases its transmit PSD by one level on resource r and (ii) asks the neighbor node(s) in set Q to decrease their transmit PSD by one level on resource r. |
| p-BG-r-Q | Node p blanks and grants resource r to one or more neighbor nodes in set Q and (i) decreases its transmit PSD by one level on resource r and (ii) tells the neighbor node(s) in set Q to increase their transmit PSD by one level on resource r. |

Each action type in Table 2 may be associated with a set of possible actions of that type. For each action type involving only node p, K possible actions may be evaluated for K available resources. For each action type involving both node p and one or more neighbor nodes in set Q, multiple possible actions may be evaluated for each available resource, with the number of possible actions being dependent on the size of the neighbor set, the size of set Q, etc. In general, set Q may include one or more neighbor nodes and may be limited to a small value (e.g., 2 or 3) in order to reduce the number of possible actions to evaluate.

Table 3 lists different types of actions for association and resource partitioning that may be evaluated, in accordance with one design. The first two rows of Table 3 cover action types for only association. The last two rows of Table 3 cover action types for both association and resource partitioning.

TABLE 3

Action Types for Association and Resource Partitioning

| Action Type | Description |
| --- | --- |
| p-HON-t-q | Node p hands out station t to neighbor node q without granting any resources. |
| p-HIN-t-q | Node p receives (or hands in) station t from neighbor node q without receiving any resources. |
| p-HOG-T-Q-R | Node p hands out one or more stations in set T to one or more neighbor nodes in set Q and also grants one or more resources in set R. |
| p-HIR-T-Q-R | Node p receives one or more stations in set T from one or more neighbor nodes in set Q and also requests one or more resources in set R. |

Each action type in Table 3 may be associated with a set of possible actions of that type. For the hand out or hand in action type involving only one station t, L possible actions may be evaluated for L candidate stations. The candidate stations may be identified based on various metrics such as channel difference, relative strength, etc. Channel difference may be defined as the ratio of (i) a channel gain between a station and a dominant interferer to (ii) a channel gain between the station and a serving node. The number of candidate stations may be limited to reduce computation complexity. For example, L stations with the L highest channel differences may be selected as candidate stations. Stations located close to their serving nodes may be omitted from evaluation for association updates. Set Q may be limited to a small number of neighbor nodes, set T may be limited to a small number of candidate stations, and set R may be limited to a small number of resources in order to reduce the number of possible actions to evaluate.

Tables 2 and 3 list some types of actions that may be evaluated for joint association and resource partitioning. Fewer, more and/or different action types may also be evaluated.

Node p may compute local metrics for different possible actions based on (i) pilot measurements from stations served by node p, (ii) the allocated resources (e.g., the lists of transmit PSD levels) for node p and neighbor nodes associated with these possible actions, and (iii) the partitioning between the access and backhaul links for the possible actions. A relay served by node p may be treated in similar manner as a station for rate computation. For each possible action, node p may first compute the spectral efficiency $R(t,r)$ of each station served by node p on each resource r, e.g., as shown in equation (3). The spectral efficiency computation may be dependent on a scheduling forecast to obtain the $\alpha(t,r)$ values for the stations served by node p. $PSD(p,r)$ and $PSD(q,r)$ in equation (3) may be obtained from the lists of transmit PSD levels for nodes p and q, respectively. $G(p,t)$ and $G(q,t)$ is equation (3) may be obtained from pilot measurements from station t for nodes p and q, respectively. The rate for each station may be computed based on the spectral efficiencies of that station on all resources, e.g., as shown in equation (2). A local metric for the possible action may then be computed based on the rates for all stations served by node p, e.g., as shown in equation (1) for the sum rate utility function.

Node p may exchange local metrics with the neighbor nodes in the neighbor set (e.g., via the backhaul) to enable each node to compute overall metrics for different possible actions. In one design, local metrics for possible actions involving only node p may be sent to all neighbor nodes in the neighbor set. Local metrics for possible actions involving neighbor node q may be sent to only node q. Local metrics for possible actions involving neighbor nodes in set Q may be sent to each node in set Q. Node p may compute overall metrics for different possible actions based on the computed local metrics and the received local metrics.

For clarity, joint association and resource partitioning has been specifically described for the downlink. Unified resource partitioning (without association) to allocate the available resources to nodes and to the access and backhaul links may be performed for the downlink in similar manner. In this case, possible actions related to resource partitioning may be evaluated, and possible actions related to association may be omitted.

Unified resource partitioning or joint association and resource partitioning may also be performed for the uplink in similar manner. In one design, a set of target interference-over-thermal (IoT) levels may be used for resource partitioning on the uplink in similar manner as the set of PSD levels for the downlink. One target IoT level may be selected for each resource on the uplink, and transmissions from each station on each resource may be controlled so that the actual IoT on that resource at each neighbor node in the active set of the station is at or below the target IoT level for that resource at the neighbor node. A utility function may be defined to quantify performance of data transmission on the uplink and may be any of the functions described above, e.g., a function of the sum of user rates. The rate of each station on the uplink may be a function of transmit power, channel gain, target IoT level, etc. Local metrics and overall metrics may be computed for different possible actions based on the utility function. Each possible action may be associated with a list of target IoT levels for all available resources for each node in a neighbor set. The possible action with the best overall metric may be selected for use.

FIG. 6 shows a design of a process 600 for supporting communication. Process 600 may be performed by a node or some other entity. Resource partitioning may be performed to allocate available resources to a set of nodes and to access and backhaul links of at least one relay (block 612). Resources allocated to a node in the set of nodes or a relay among the at least one relay may be determined based on the resource partitioning (block 614).

In one design, the resource partitioning in block 612 may be performed in two steps. In the first step, resource partitioning may be performed to allocate the available resources to the set of nodes. Resources allocated to a serving node of the relay may be determined based on this resource partitioning. In the second step, resource partitioning may be performed to allocate the resources allocated to the serving node to the access and backhaul links of the relay. In another design, the resource partitioning in block 612 may be performed in a single step to concurrently allocate the available resources to the set of nodes and to the access and backhaul links of the at least one relay.

In one design, the set of nodes may include base stations and the at least one relay. Resource partitioning may be performed based on metrics computed for each node in the set of nodes. The metrics for each node may be indicative of the performance of that node. In another design, the set of nodes may include at least one serving node for the at least one relay and may exclude the at least one relay. Resource partitioning may be performed based on metrics computed for each node in the set of nodes. The metrics for each serving node may be indicative of the performance of the serving node as well as all relays served by the serving node.

In one design, resource partitioning may be performed by limiting a backhaul rate for a relay to an access capacity of the relay, e.g., as shown in equation (10). The access capacity of the relay may be variable and dependent on the resources allocated to the access link of the relay. In another design, resource partitioning may be performed by limiting the total rate for all stations served by the relay to a backhaul capacity of the relay, e.g., as shown in equation (9). The backhaul capacity may be variable and dependent on the resources allocated to the backhaul link of the relay.

In one design, resource partitioning may be performed by modeling the relay as a station by the serving node of the relay. In another design, resource partitioning may be performed by modeling the relay as M stations each having a rate of R/M, where M is the number of stations served by the relay and R is the total rate of the M stations.

In one design, association for at least one station may be performed. At least one serving node for the at least one station may be determined based on the association. Association and resource partitioning may be performed jointly by evaluating a plurality of possible actions related to association and resource partitioning, as described above.

The available resources may be for time units, frequency units, time-frequency units, etc. In one design, the available resources may be for the downlink. In this design, the resources allocated to a node or a relay may be given by a list of transmit PSD levels, one transmit PSD level for each available resource. In another design, the available resources may be for the uplink. In this design, the resources allocated to a node or a relay may be given by a list of target IoT levels, one target IoT level for each available resource. The allocated resources may also be given in other manners.

FIG. 7 shows a design of an apparatus 700 for supporting communication. Apparatus 700 includes a module 712 to perform resource partitioning to allocate available resources to a set of nodes and to access and backhaul links of at least one relay, and a module 714 to determine resources allocated to a node in the set of nodes or a relay among the at least one relay based on the resource partitioning.

FIG. 8 shows a design of a process 800 for performing unified resource partitioning, which may be used for blocks 612 and 614 in FIG. 6. A node may compute local metrics for a plurality of possible actions related to resource partitioning for a set of nodes and resource partitioning between the access and backhaul links of at least one relay (block 812). The node may send the computed local metrics to at least one neighbor node in the set of nodes to enable the neighbor node(s) to compute overall metrics for the plurality of possible actions (block 814). The node may receive local metrics for the plurality of possible actions from the at least one neighbor node (block 816). The node may determine overall metrics for the plurality of possible actions based on the computed local metrics and the received local metrics for these possible actions (block 818). The node may select one of the plurality of possible actions based on the overall metrics for these possible actions (block 820). The node may determine resources allocated to the set of nodes and resources allocated to the access and backhaul links of the at least one relay based on the selected action (block 822).

In one design, the plurality of possible actions may include possible actions related to association for at least one station. At least one serving node for the at least one station may be determined based on the overall metrics for the plurality of possible actions.

In one design of block 812, the node may compute a local metric for each possible action as follows. The node may determine allocation of available resources to the set of nodes for the possible action. For example, the node may determine (i) a list of transmit PSD levels for each node for the downlink or (ii) a list of target IoT levels for each node for the uplink. The node may also determine allocation of resources between the access and backhaul links for the possible action. The node may determine at least one rate for at least one station communicating with the node based on the allocation of the available resources to the set of nodes and to the access and backhaul links. The node may then determine the local metric for the possible action based on the at least one rate for the at least one station, e.g., as shown in equation (1). In general, the local metric for each possible action may be computed based on a function of rate, or latency, or queue size, or some other parameter, or a combination thereof. The local metric for each possible action may also be computed based on a function of sum of rates, or minimum of rates, or sum of quantities determined based on rates, etc.

The description above is for a distributed design in which each node in the set of nodes may compute and exchange local and overall metrics for different possible actions. For a centralized design, a designated entity may compute local and overall metrics for different possible actions and may select the best action.

Figure 9:
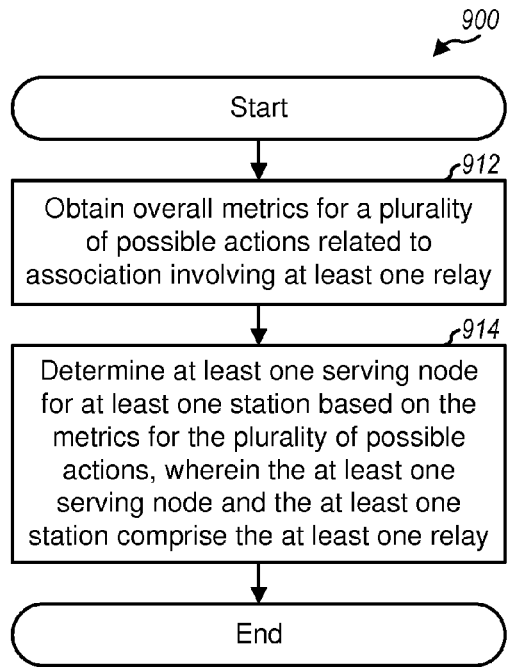
FIGS. 9 and 10 show a process and an apparatus, respectively, for supporting communication with association involving relays.

FIG. 9 shows a design of a process 900 for supporting communication. Process 900 may be performed by a node or some other entity. Metrics for a plurality of possible actions related to association involving at least one relay may be obtained (block 912). The plurality of possible actions may comprise (i) possible actions for handing out one or more stations from a node to neighbor nodes and/or (ii) possible actions for handing in one or more stations from the neighbor nodes to the node. At least one serving node for at least one station may be determined based on the metrics for the plurality of possible actions (block 914). The at least one serving node and the at least one station may comprise at least one relay. For example, the at least one serving node may comprise a base station, and the at least one station may comprise a relay. As another example, the at least one serving node may comprise a relay, and the at least one station may comprise a UE.

In one design, metrics (e.g., rates, local metrics, and/or overall metrics) for a relay may be computed based on resources allocated to the access and backhaul links of the relay. In another design, metrics for the relay may be computed based on an access capacity and a backhaul capacity of the relay. For both designs, the metrics may be used to (i) select a serving node for the relay and/or (ii) determine whether to select the relay as a serving node for a UE.

Figure 10:
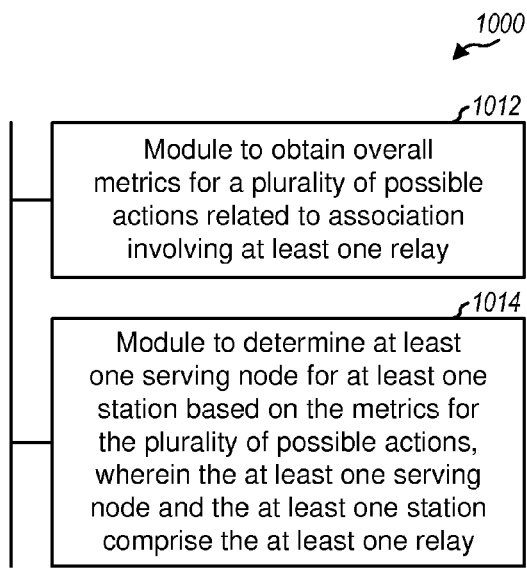

FIG. 10 shows a design of an apparatus 1000 for supporting communication. Apparatus 1000 includes a module 1012 to obtain metrics for a plurality of possible actions related to association involving at least one relay, and a module 1014 to determine at least one serving node for at least one station based on the metrics for the plurality of possible actions. The at least one serving node and the at least one station may comprise the at least one relay.

Figure 11:
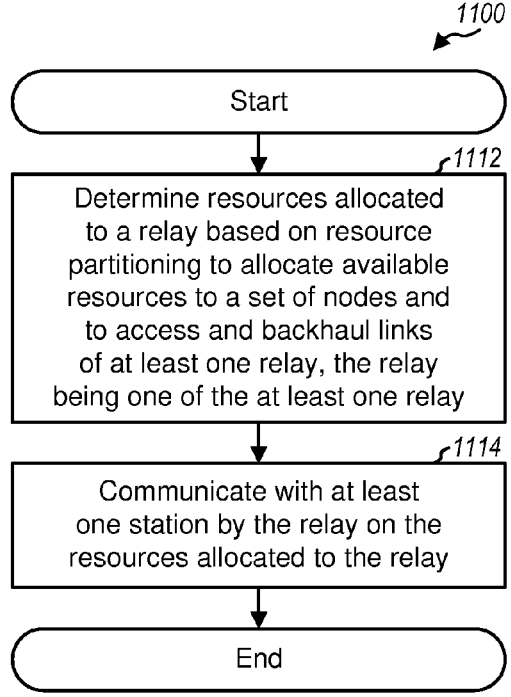
FIGS. 11 and 12 show a process and an apparatus, respectively, for supporting communication by a relay.

FIG. 11 shows a design of a process 1100 for supporting communication. Process 1100 may be performed by a relay (as described below) or by some other entity. The relay may determine resources allocated to the relay based on resource partitioning to allocate available resources to a set of nodes and to access and backhaul links of at least one relay (block 1112). The relay may be one of the at least one relay. The relay may communicate with at least one station on the resources allocated to the relay (block 1114).

In one design, the set of nodes may include the relay. In this design, the relay may perform resource partitioning with other nodes in the set of nodes to determine the resources allocated to the relay. In another design, the set of nodes may exclude the relay. In this design, the relay may exchange information used for resource partitioning (e.g., access capacity, number of stations served by the relay, etc.) with a serving node of the relay. The serving node may perform resource partitioning based on the exchanged information.

In one design, the relay may determine an access capacity of the relay. Resource partitioning may be performed by limiting a backhaul rate for the relay to the access capacity of the relay. In another design, the relay may determine a backhaul capacity of the relay and may limit the total rate of the at least one station based on the backhaul capacity of the relay.

In one design, the relay may further determine a station handed out from the relay or handed in to the relay. In one design, handover of the station may be determined based on association performed jointly with resource partitioning by evaluating a plurality of possible actions related to association and resource partitioning.

Figure 12:
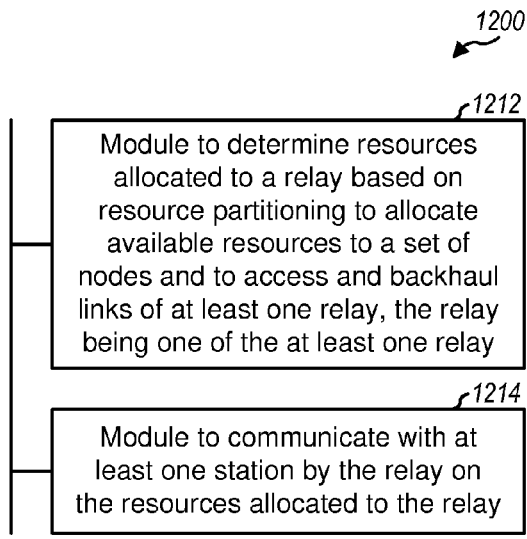
Figures 13, 14:
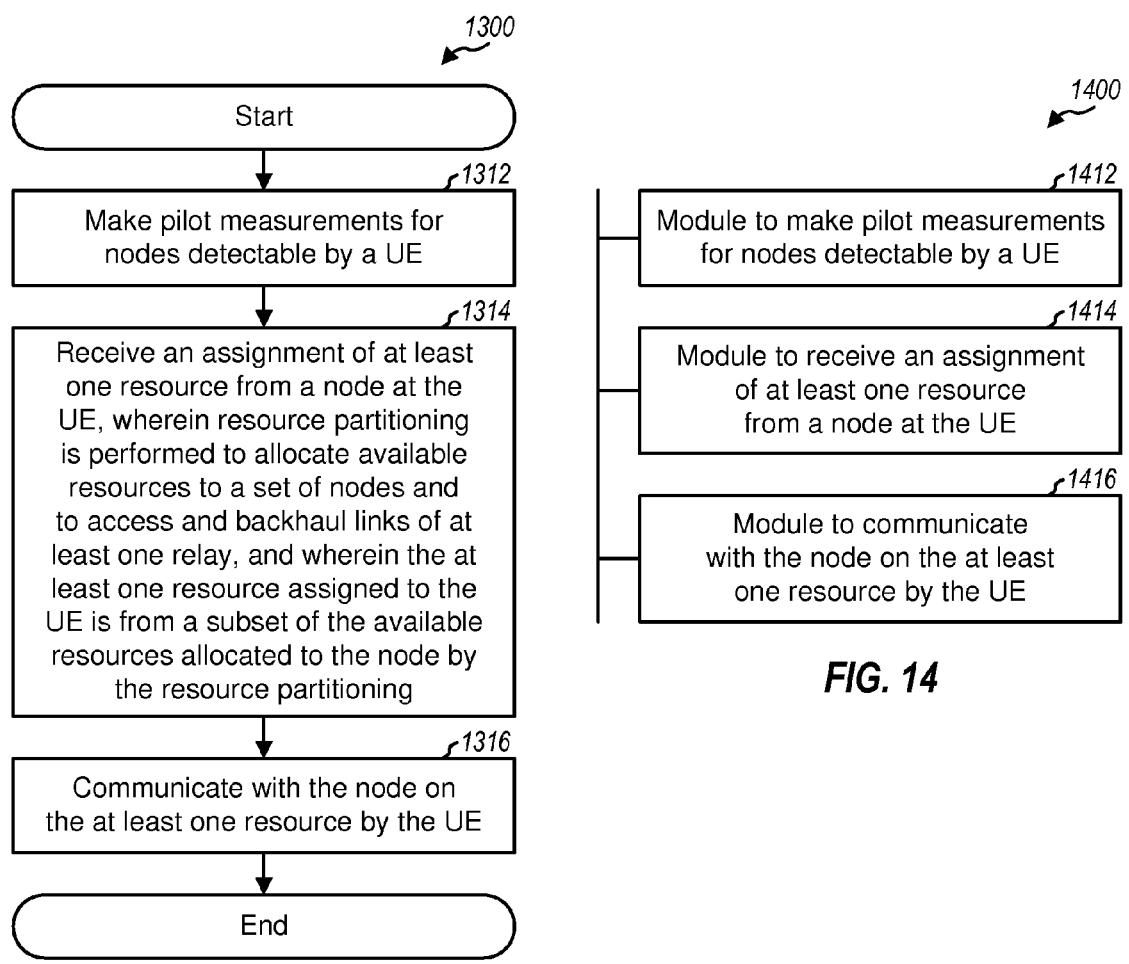
FIGS. 13 and 14 show a process and an apparatus, respectively, for communicating by a UE.

FIG. 12 shows a design of an apparatus 1200 for exchanging data in a wireless communication system. Apparatus 1200 includes a module 1212 to determine resources allocated to a relay based on resource partitioning to allocate available resources to a set of nodes and to access and backhaul links of at least one relay, the relay being one of the at least one relay, and a module 1214 to communicate with at least one station by the relay on the resources allocated to the relay FIG. 13 shows a design of a process 1300 for communicating in a wireless network. Process 1300 may be performed by a UE (as described below) or by some other entity. The UE may make pilot measurements for nodes detectable by the UE (block 1312). The pilot measurements may be used to determine an active set for the UE, to compute metrics for association and/or resource partitioning, and/or for other purposes. The UE may receive an assignment of at least one resource from a node (block 1314). Resource partitioning may be performed to allocate available resources to a set of nodes and to access and backhaul links of at least one relay. The at least one resource assigned to the UE may be from a subset of the available resources allocated to the node by the resource partitioning. In one design, the node may be one of the at least one relay, and the subset of the available resources allocated to the node may be for the access link of the node/relay.

The UE may communicate with the node on the at least one resource (block 1316). In one design, for the downlink, the UE may receive data transmission on the at least one resource from the node. The data transmission may be sent by the node on each of the at least one resource at a transmit PSD level allowed for the node on the resource. In another design, for the uplink, the UE may send data transmission on the at least one resource to the node. The UE may send the data transmission on each of the at least one resource at a transmit power level determined based on at least one target IoT level for at least one neighbor node on the resource.

FIG. 14 shows a design of an apparatus 1400 for supporting communication. Apparatus 1400 includes a module 1412 to make pilot measurements for nodes detectable by a UE, a module 1414 to receive an assignment of at least one resource from a node at the UE, and a module 1416 to communicate with the node on the at least one resource by the UE.

The modules in FIGS. 7, 10, 12 and 14 may comprise processors, electronic devices, hardware devices, electronic components, logical circuits, memories, software codes, firmware codes, etc., or any combination thereof.

Figure 15:
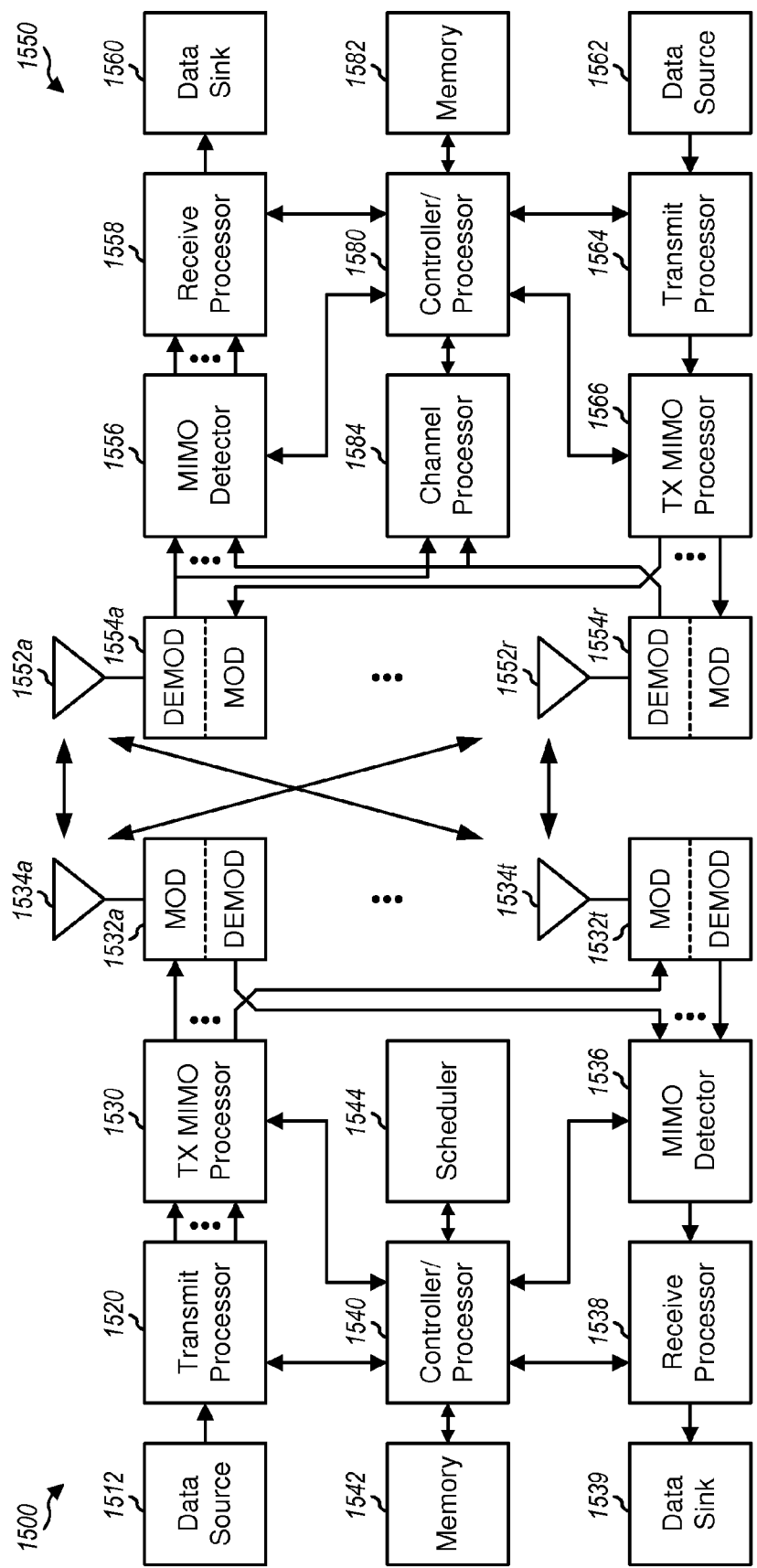
FIG. 15 shows a block diagram of a node and a station.

FIG. 15 shows a block diagram of a design of a node 1500 and a station 1550. Node 1500 may be a base station or a relay. Station 1550 may be a relay or a UE. Node 1500 may be equipped with T antennas 1534a through 1534t, and station 1550 may be equipped with R antennas 1552a through 1552r, where in general T≥1 and R≥1.

At node 1500, a transmit processor 1520 may receive data from a data source 1512 for one or more stations and control information from a controller/processor 1540. Processor 1520 may process (e.g., encode, interleave, and modulate) the data and control information to obtain data symbols and control symbols, respectively. Processor 1520 may also generate pilot symbols for pilot or reference signal. A transmit (TX) multiple-input multiple-output (MIMO) processor 1530 may perform spatial processing (e.g., precoding) on the data symbols, the control symbols, and/or the pilot symbols, if applicable, and may provide T output symbol streams to T modulators (MODs) 1532a through 1532t. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink signal. T downlink signals from modulators 1532a through 1532t may be transmitted via T antennas 1534a through 1534t, respectively.

At station 1550, antennas 1552a through 1552r may receive the downlink signals from node 1500 and may provide received signals to demodulators (DEMODs) 1554a through 1554r, respectively. Each demodulator 1554 may condition (e.g., filter, amplify, downconvert, and digitize) its received signal to obtain input samples. Each demodulator 1554 may further process the input samples (e.g., for OFDM, etc.) to obtain received symbols. A MIMO detector 1556 may obtain received symbols from all R demodulators 1554a through 1554r, perform MIMO detection on the received symbols if applicable, and provide detected symbols. A receive processor 1558 may process (e.g., demodulate, deinterleave, and decode) the detected symbols, provide decoded data for station 1550 to a data sink 1560, and provide decoded control information to a controller/processor 1580.

On the uplink, at station 1550, a transmit processor 1564 may receive and process data from a data source 1562 and control information from controller/processor 1580. Processor 1564 may also generate pilot symbols for pilot or reference signal. The symbols from transmit processor 1564 may be precoded by a TX MIMO processor 1566 if applicable, further processed by modulators 1554a through 1554r (e.g., for SC-FDM, OFDM, etc.), and transmitted to node 1500. At node 1500, the uplink signals from station 1550 may be received by antennas 1534, processed by demodulators 1532, detected by a MIMO detector 1536 if applicable, and further processed by a receive processor 1538 to obtain decoded data and control information sent by station 1550. Processor 1538 may provide the decoded data to a data sink 1539 and the decoded control information to controller/processor 1540.

Controllers/processors 1540 and 1580 may direct the operation at node 1500 and station 1550, respectively. A channel processor 1584 may make pilot measurements, which may be used to determine an active set for station 1550 and to compute channel gains, rates, metrics, etc. Processor 1540 and/or other processors and modules at node 1500 may perform or direct process 500 in FIG. 5, process 600 in FIG. 6, process 800 in FIG. 8, process 900 in FIG. 9, process 1100 in FIG. 11, and/or other processes for the techniques described herein. Processor 1580 and/or other processors and modules at station 1550 may perform or direct process 1100 in FIG. 11, process 1300 in FIG. 13, and/or other processes for the techniques described herein. Memories 1542 and 1582 may store data and program codes for node 1500 and station 1550, respectively. A scheduler 1544 may schedule stations for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining, using at least one network entity, loading information corresponding to at least one neighbor node;
   obtaining, using the at least one network entity, metrics for a plurality of possible actions related to association involving at least one relay;
   determining, using the at least one network entity, at least one serving node for at least one station based on said loading information and the metrics for the plurality of possible actions;
   communicating, using the at least one serving node, with the at least one station;
   wherein the at least one serving node is one of a base station or the at least one relay;
   wherein the metrics for the at least one relay are based on at least one of:
      resources allocated to access and backhaul links of the at least one relay,
      an access capacity of the at least one relay, or
      a backhaul capacity of the at least one relay; and
   wherein said network entity is one of said base station or said at least one relay, said at least one relay operating as a network node capable of communicating with said at least one station on an access link.

2. The method of claim 1, wherein the plurality of possible actions comprise possible actions for handing out one or more stations from a node to neighbor nodes, or possible actions for handing in one or more stations from the neighbor nodes to the node, or both.

3. The method of claim 1, wherein the at least one serving node comprises a base station and the at least one station comprises a relay, or the at least one serving node comprises a relay and the at least one station comprises a user equipment (UE), or both.

4. The method of claim 1, wherein the metrics for the at least one relay are based on resources allocated to access and backhaul links of the at least one relay.

5. The method of claim 1, wherein the metrics for the at least one relay are based on an access capacity of the at least one relay.

6. The method of claim 1, wherein said loading information indicates a number of stations currently served by the at least one neighbor node.

7. An apparatus for wireless communication, comprising:
   means for obtaining loading information corresponding to at least one neighbor node and for obtaining metrics for a plurality of possible actions related to association involving at least one relay;
   means for determining at least one serving node for at least one station based on said loading information and the metrics for the plurality of possible actions;
   means for communicating with the at least one station;
   wherein the at least one serving node is one of a base station or the at least one relay;
   wherein the metrics for the at least one relay are based on at least one of:
      resources allocated to access and backhaul links of the at least one relay,
      an access capacity of the at least one relay, or
      a backhaul capacity of the at least one relay; and
   wherein said apparatus is a network entity and is one of said base station or said at least one relay, said at least one relay operating as a network node capable of communicating with said at least one station on an access link.

8. The apparatus of claim 7, wherein the plurality of possible actions comprise possible actions for handing out one or more stations from a node to neighbor nodes, or possible actions for handing in one or more stations from the neighbor nodes to the node, or both.

9. An apparatus for wireless communication, comprising:
   a memory;
   at least one processor coupled to the memory, said at least one processor being configured to:
      obtain loading information corresponding to at least one neighbor node;
      obtain metrics for a plurality of possible actions related to association involving at least one relay, to store the metrics in the memory;
      determine at least one serving node for at least one station based on said loading information and the metrics for the plurality of possible actions;
   wherein the at least one serving node is one of a base station or the at least one relay;
   wherein the metrics for the at least one relay are based on at least one of:
      resources allocated to access and backhaul links of the at least one relay,
      an access capacity of the at least one relay, or
      a backhaul capacity of the at least one relay; and
   wherein said apparatus is a network entity and is one of said base station or said at least one relay, said at least one relay operating as a network node capable of communicating with said at least one station on an access link.

10. A non-transitory computer-readable medium of an apparatus, the non-transitory computer-readable medium storing computer executable code, comprising:
   code for causing at least one computer to obtain loading information corresponding to at least one neighbor node;
   code for causing the at least one computer to obtain metrics for a plurality of possible actions related to association involving at least one relay;
   code for causing the at least one computer to determine at least one serving node for at least one station based on said loading information and the metrics for the plurality of possible actions;
   code for causing the at least one computer to communicate with the at least one station;

wherein the at least one serving node is one of a base station or the at least one relay;
wherein the metrics for the at least one relay are based on at least one of:
resources allocated to access and backhaul links of the at least one relay,
an access capacity of the at least one relay, or
a backhaul capacity of the at least one relay; and
wherein said apparatus is a network entity and is one of said base station or said at least one relay, said at least one relay operating as a network node capable of communicating with said at least one station on an access link.

* * * * *